June 19, 1928. Re. 17,003

H. R. WARREN

METHOD AND APPARATUS FOR SEPARATING SEEDS AND OTHER BODIES

Original Filed April 7, 1922 6 Sheets-Sheet 1

June 19, 1928. Re. 17,003

H. R. WARREN

METHOD AND APPARATUS FOR SEPARATING SEEDS AND OTHER BODIES

Original Filed April 7, 1922 6 Sheets-Sheet 2

Inventor.
Harry R. Warren.
By Clarence A. Wilson
Attorneys

June 19, 1928. Re. 17,003
H. R. WARREN
METHOD AND APPARATUS FOR SEPARATING SEEDS AND OTHER BODIES
Original Filed April 7, 1922 6 Sheets-Sheet 3
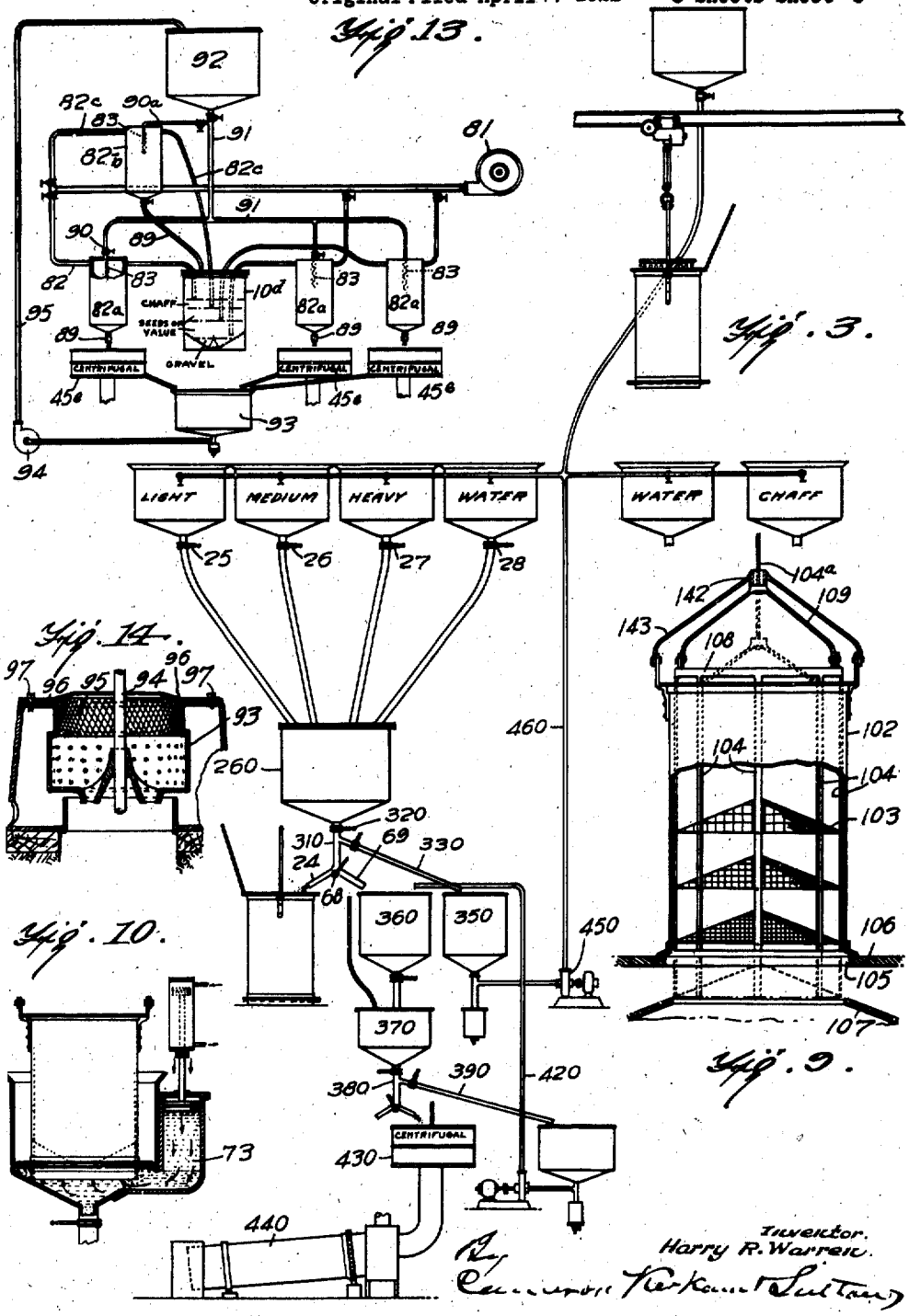
Inventor.
Harry R. Warren.
By Cameron, Kerkam & Sutton
Attorneys June 19, 1928.

H. R. WARREN

Re. 17,003

METHOD AND APPARATUS FOR SEPARATING SEEDS AND OTHER BODIES

Original Filed April 7, 1922 6 Sheets-Sheet 4

Inventor.
Harry R. Warren
Attorneys

June 19, 1928.
H. R. WARREN
Re. 17,003
METHOD AND APPARATUS FOR SEPARATING SEEDS AND OTHER BODIES
Original Filed April 7, 1922 6 Sheets-Sheet 5
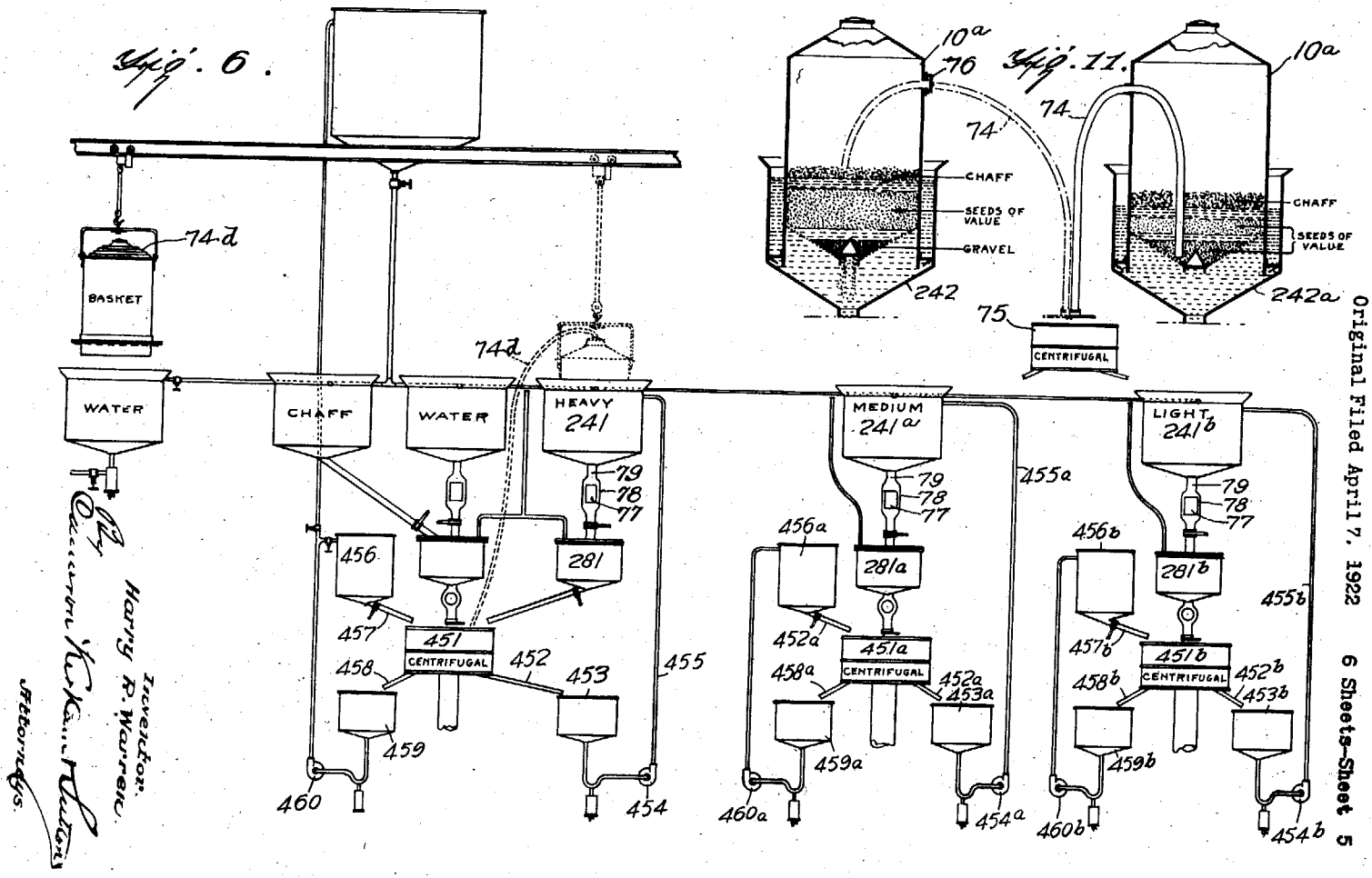

June 19, 1928. Re. 17,003

H. R. WARREN

METHOD AND APPARATUS FOR SEPARATING SEEDS AND OTHER BODIES

Original Filed April 7, 1922 6 Sheets-Sheet 6

Inventor
Harry R. Warren.
By Cameron Herkam & Sutton
Attorneys

Reissued June 19, 1928. Re. 17,003

UNITED STATES PATENT OFFICE.

HARRY R. WARREN, OF CHICAGO, ILLINOIS, ASSIGNOR TO WARREN SEED CLEANING COMPANY, OF RENO, NEVADA, A CORPORATION OF NEVADA.

METHOD AND APPARATUS FOR SEPARATING SEEDS AND OTHER BODIES.

Original No. 1,609,636, dated December 7, 1926, Serial No. 550,396, filed April 7, 1922. Application for reissue filed February 15, 1928. Serial No. 254,572.

Speaking from a practical experience of many years as a seed producer on a large scale in which I have made use of the best appliances on the market available for cleaning and separating seed, it is impossible by such appliances known to me to get results which do not involve serious waste and loss of seeds of value which must be treated as mere tailings or screenings because of their unsalvable mixture with a large percentage of noxious seeds, and which, even when the percentage of objectionable seeds is sufficiently small to comply with the pure seed laws which exist in nearly all States, are a serious menace from the propagation of baneful growths which is inevitable from even the planting of a few noxious seeds present in the proportion permitted by the pure seed laws. This inadequacy of separation of noxious seeds from good seeds is reflected in the pure seed laws which, placing the standard of purity as high as possible without being prohibitive of dealing in seeds (and thus suicidally making it impossible for the farmer to obtain seeds), dare not, in the most exacting States, require a higher percentage of purity than from 90% to 97%. In some States a percentage as low as 90% is permitted. Obviously the waste in good seeds and the loss from the damage caused by weed pests are enormous. The object of my invention is to eliminate this loss. My invention is the outcome of thorough investigation of the methods and appliances commonly used for seed separation and of the problems that the great diversities in seeds present. By my invention perfect salvage or separation can be effected, and by means of apparatus of simple and not costly construction, and of such rapid performance of the operations required as to be quite inexpensive. My invention is based on the familiar fact that bodies of different specific gravities, when placed in a liquid, will settle or float therein at different levels, and while I am aware that it has been proposed to utilize this principle in the separation of seeds, I do not know that it has been done in actual practice or on a commercial scale, and I am convinced from my practically ascertained knowledge of the subject that unless characteristics which differentiate my method and apparatus from what has been heretofore proposed are utilized, it is impossible to employ such principle in a truly practical way.

The problem of seed separation by flotation is rendered difficult because seeds in the same mixture will differ but very little in specific gravity. A liquid such as normal water is not efficient in most cases. A heavier or denser liquid must be used, but that brings the liquid and seeds, or some of them, to so near a like specific gravity that anything that will cause movement or disturbance of the liquid will have a turbulent effect on the seeds and result in again mixing them, if they have separated into different strata or levels. Devices therefore intended for the removal of the sorted seeds from the liquid after the stratification has taken place, undo, in part at least, the separation that may have been produced. Other difficulties that may be named are the effects that liquids, such as plain water, and aqueous solutions may have on the seeds. Thus salt (sodium chloride), in the water to add to its density sterilizes some seeds, and any undue saturation of the seeds may be objectionable. It is therefore evident that the efficient, safe, and otherwise satisfactory separation of seeds in a mixture of assorted seeds, chaff, dirt, etc., calls for the solution of various problems.

In the drawings:

Fig. 3 is a view similar to Fig. 1 illustrating another embodiment of the apparatus of my invention;

Fig. 6 is a view like Fig. 1 of another form of my invention;

Fig. 9 is a vertical section of a basket for grading potatoes;

Fig. 10 is a detail view in vertical section illustrating a pump device for subjecting the treating liquid to pressure;

Fig. 11 is a view in vertical section, diagrammatic in nature, illustrating the stratification and separation procedure;

Fig. 13 is a view somewhat diagrammatic illustrating a pneumatic stratum removing means;

Fig. 14 is a vertical section of a centrifugal drier that I may use provided with scarifying means.

Figure 1:
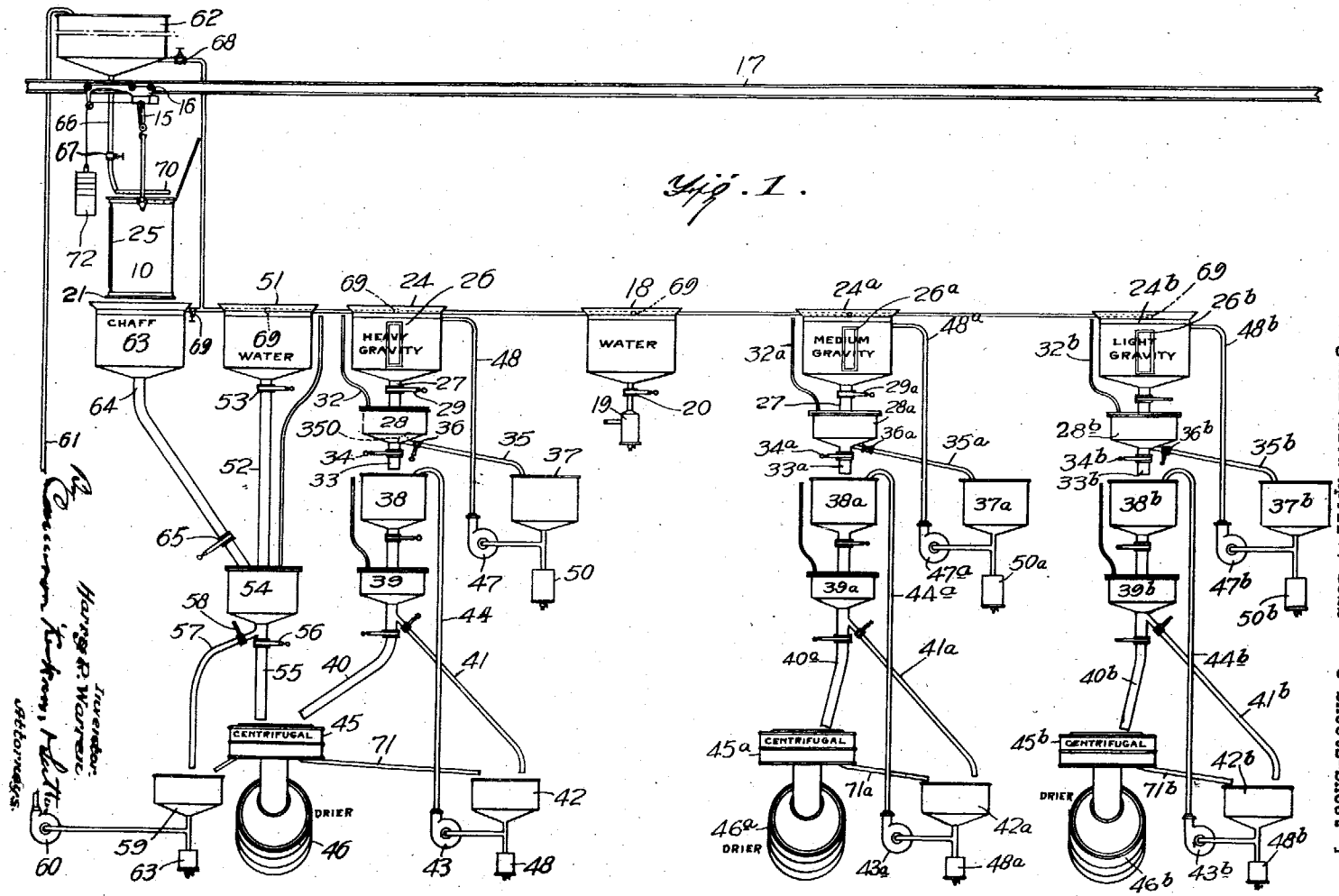
Fig. 1 is a front elevation of apparatus which may be used to practice the method or process I have invented and which has a construction that embodies my invention regarded as an apparatus.

My invention, both as to method or process and apparatus, may be carried out or practiced by means of apparatus differing widely in structure and arrangement from that shown in the drawings, and hence the scope of my invention is not to be confined to what is illustrated, and which I describe hereafter, but extends to what is defined by or embraced within the scope of the appended claims.

Generally describing the apparatus shown in the drawings, it embodies a series of liquid-holding tanks of similar construction, some of which contain pure water, and several (in the case shown, three in number), that contain solutions of different densities and a receptacle for the seed mixture to be treated, which for convenience, I shall call a basket, which in succession is lowered into and removed from the liquids in the respective tanks. The basket at the bottom or lower part is of open, foraminous material, but the sides closed, so that as the basket is lowered into the liquid, the liquid in the inclosing tank will, or may, ascend into the basket, means being provided to exert pressure on the liquid as the basket descends to cause the flow of the liquid into the basket under positive pressure. This pressure is produced, in the case of the apparatus shown in the drawings, by surrounding the basket at its bottom with a ring which in effect constitutes a piston that presses downward on the liquid in the tank as the basket descends, a suitable valve arrangement being provided that opens when the basket ascends to allow the flow of liquid past said piston. Thus by a sort of pumping action the liquid, when the basket is alternately lowered and lifted, may be caused to surge back and forth between the tank and the interior of the basket and thereby efficiently agitate the seed or other elements of the mixture and facilitate their disposition in horizontal layers according to their respective specific gravities. When the components or elements of the mixture are stratified the heaviest and therefore the lowermost layer is removed by discharging it together with its enveloping liquid from the bottom of the basket and passing what is thus separated through apparatus which will remove any solution adhering thereto so that in the case of seeds of value they may be delivered from the apparatus in a normal or natural state and so that the solution may be salvaged for use over again. By locating the treating tanks in an elevated position I am able to use gravity in effecting the separation of a layer or stratum of the mixture and its passage through the washing and other appliances that my treatment contemplates.

Figure 2:
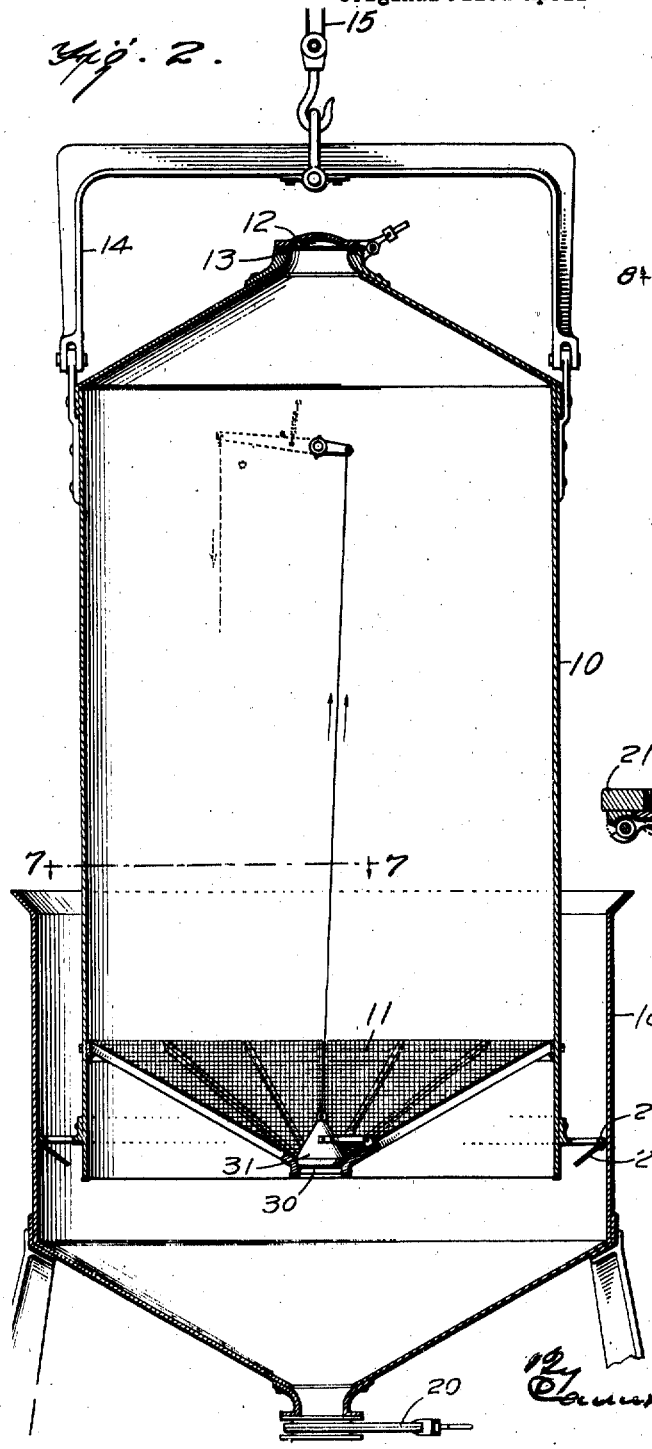
Fig. 2 is a detail view in vertical section through the basket and one of the liquid containing tanks.
Figure 7:
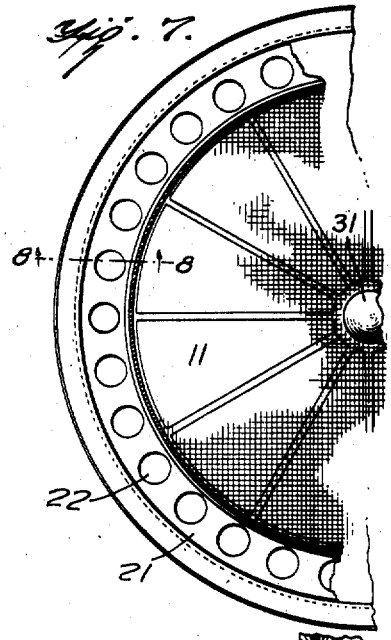
Fig. 7 is a section on line 7—7 of Fig. 2.
Figure 8:
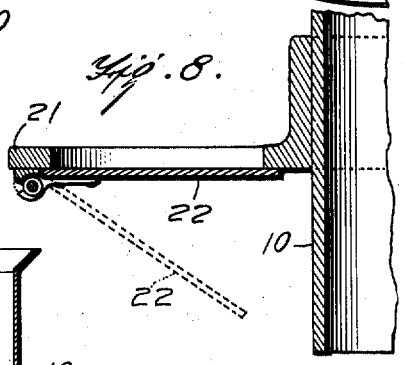
Fig. 8 is a vertical section on the line 8—8 of Fig. 7.

Proceeding now with a description in detail of what is shown in the drawings, and referring first to what is shown in Figs. 1 and 2, the basket, 10, is of cylinder form having imperforate side walls and a bottom, 11, of wire mesh or otherwise perforated, and of funnel shape, so that, while it will adequately support a mixture of seeds and other material, there may be a free flow of liquid into and out of the basket. It has a top or cover, 12, preferably hinged so that it may be swung to open and close the top which has a gasket, 13, or other packing, to make an airtight closure. When the top is in closed position and the basket is lifted, whatever liquid is in the basket at such time will be lifted with the basket and may be emptied therefrom by opening the cover to allow the entrance of air. At its top the basket has pivoted to it a handle or bail, 14, by which the basket may be suspended from the rope or chain, 15, of a hoist, 16, that is mounted upon an overhead trolley track, 17, above the series of tanks, and thus the basket may be shifted back and forth between the tanks and lowered into and raised from any one of them.

The tank in which the seed mixture is first treated is a tank, 18, that contains pure or normal water, the purpose of this treatment being to wash the seed of any adhering dust or dirt and also to facilitate the movement of the seeds in the heavier solutions, since it has been found that previously moistened seeds stratify in the heavier solutions more readily than dry seeds. The water tank, 18, at its bottom is in communication with a sediment box, 19, a valve, 20, being provided in the pipe that runs from the tank to the sediment box.

Near the bottom of the basket, 10, and on the outside thereof is a ring, 21, which fits with more or less closeness the annular space between the basket and the wall of the tank, 18, and constitutes a piston which acts upon the water in the tank, 18, around the basket as the latter descends and thereby the water is forced from the tank, 18, into the basket with the result that the basket contents are stirred up or agitated, and thus efficient access of the water to the seeds, etc., in the basket afforded. Any desired degree of turbulent movement may be secured by varying the rate of movement of the basket. The piston forming ring, 21, is provided with a check valve or valves, 22, which prevent the upward passage of liquid as the basket descends in the tank into the space between the basket and the tank while allowing the flow into such space of liquid when the basket is lifted.

After being washed in the water tank, 18, the basket, 10, is moved to position above a tank, 24, which contains a liquid of the greatest density that is to be used in the treatment, such density being sufficient to cause the ascent in the liquid of all components of the mixture, excepting, for example, such noxious seeds as dodder, gravel, dirt, and the like, so that heavy dodder, gravel, etc., will be accumulated or collected in the lower part of the basket in a layer or stratum sharply separated from the lighter components of the mixture which will contain seeds of value of several grades and such light stuff as chaff. The separation or segregation of the mixture by the action of the solution in the tank, 24, is facilitated by the reciprocation or up and down movement of the basket, which, by the pumping action on the liquid in the tank, 24, such as I have described, will cause the displacement of the components and their loosening up or separation from one another. In order that the action taking place in the basket, 10, may be readily seen, the basket, 10, may have in its side an observation window, or glass, 25, and an observation window or glass, 26, may be provided in the side of the tank 24. To obviate any obscuring effect of the liquid in the annular space between the basket and the tank, 24, the basket when it is desired to inspect its contents may be lifted sufficient in the tank, 24, to clear the liquid in the tank, 24, such liquid as may be forced into the basket, 10, being contained therein by the closing of the basket cover, 12.

From the bottom of the tank, 24 (which is preferably of cone form or funnel shaped), depends a pipe, 27, which leads into the top of a smaller tank, 28, directly below the tank, 24, a valve, 29, being placed in such pipe to control flow from the tank, 24, to the tank, 28, below it. When the stratification to be effected in tank, 24, is accomplished, the heavy objectionable material collected in the bottom part of the basket, 10, is discharged therefrom through a small opening, 30, in the perforated bottom, 11, of the basket, which hole, 30, is closed by a valve, 31, which is moved to an open position when such removal is to be effected. The valve, 29, also being open, the material flowing out of the basket will pass through the pipe, 27, into the tank, 28, the valve, 29, being closed to shut off the flow when this has been removed from the basket, the valve, 31, controlling the opening, 30, in the bottom of the basket being also closed. The top of the tank, 28, is closed, and to allow escape of air from within the tank as it fills with heavy material and solution that flows from the tank, 24, a breather pipe, 32, is provided that at its upper end is carried to a level above the highest level of liquid within the tank, 24. The tank, 28, which also preferably has a hopper shaped bottom, has an outlet pipe, 33, from its bottom which pipe has a valve, 34, and above the valve, 34, a branch outlet pipe 35, having a control valve, 36, leads to a tank, 37, so that when the valve, 36, is open, and the valve, 34, closed, such solution as enters the tank, 28, may be delivered to the tank, 37, which for convenience I term the salvage solution tank, since its purpose is to save such solution. The opening into the pipe, 35, from the discharge pipe, 33, has a screen, 350, which will allow only liquid to pass into the pipe, 35. The solution having thus been drained from the tank, 28, the valve, 36, in pipe, 35, is closed, and the valve, 34, in the outlet pipe, 33, is open so that the drained material therein may pass into a receiving tank 38, which is partially filled with clear water, to wash the material entering the tank, 38, of any treating solution adhering thereto for the purpose of saving it. From the receiving tank, 38, the heavy solids and the liquid are passed to a tank, 39, and valved pipes, 40 and 41, effect the separation of liquid and solid matters that pass from the tank, 39. The liquid from the pipe, 41, is delivered to a receiving tank, 42, with which is connected a pump, 43, that returns it through pipe, 44, to the tank, 38. The solid matter passing through the discharge pipe, 40, is delivered to drying apparatus which consists preferably of a centrifugal drier, 45, and a rotary drum type drier, 46, from which it is discharged in a thoroughly dried condition.

For the return to the tank, 24, of solution drained into the catch tank or basin, 37, a pump, 47, may be provided from which a pipe, 48, leads to the upper part of the tank, 24. The catch tank, 37, is provided with a settling or sediment box, 50.

After the operation in connection with tank, 24, which results in the elimination of refuse material settling in the basket below the seeds of value and matters lighter than the latter, the remaining basket contents are subjected to the action of tanks and other apparatus identical with that already described in connection with the stratification preliminary to the removal of refuse material, the similar or corresponding parts being similarly numbered with an affix of the letter *a* to each number. The tank, 24ᵃ, contains a solution of a density that will support or float only bodies of less specific gravity than the seeds of value of first grade and in a layer higher than such seeds of value, which latter are thereupon removed from the basket by a treatment or procedure identical with that described in connection with the removal of heavy refuse matter, in the mixture; and a third apparatus consisting of a solution-holding tank and other tanks and apparatus precisely similar to the two which comprise the solution tank, 24, and the solution tank, 24ᵃ, is provided for the stratification of seeds of value of second quality and the lighter bodies remaining with them in the basket, 10, and the corresponding parts of this third unit or treating apparatus are designated by the same numerals as those two units with the suffix to each numeral of the letter, *b*. The solution in the tank, 24ᵇ, has a density which causes such light material as chaff to rise to a level in the basket higher than the second quality seeds of value, and by a similar procedure to that hereinbefore described, the second quality seeds of value are removed from the basket, 10, leaving therein only such light material as chaff, pieces of straw, etc.

The basket, 10, now containing light refuse material, with which may be mixed seeds having some value as chicken or stock feed, is moved by the trolley to a position above a tank 51 that contains clear water which will serve to separately stratify whatever remains of seeds of value and the lighter chaff or straw, the seeds of value settling in the water to the bottom, the basket, 10, being worked in connection with that tank in a similar manner to that in which it is worked in connection with the tanks containing solutions of greater density than water. The seeds of value stratified by the operation of the tank, 51, after being discharged into the tank, 51, are discharged from the latter through an outlet pipe, 52, having a valve, 53, into a lower collecting tank, 54, which has an outlet pipe, 55, that delivers the seed of value to the centrifugal 45. The pipe, 55, has a valve, 56, and above the valve, 56, a branch outlet, 57, having a valve, 58, is provided for draining water or liquid that may flow into the tank, 54, along with the seeds of value. The pipe, 57, discharges to a receiving tank, 59, from which by a pump, 60, the water or liquid may be pumped through a pipe, 61, to an elevated tank, 62. The receiving tank, 59, has a settling or sediment box, 63.

The subjection of the contents of the basket to the action of water in the tank, 51, washes therefrom any treating solution which may adhere thereto, and such solution is salvaged by the drainage that takes place from the tank, 54, through the valved pipe, 57. It will be understood that the inlet end of the pipe, 57, has a screen that permits only liquid to pass into such pipe.

After treatment in the tank, 51, the basket is carried to a tank, 63, and inverted thereover so as to empty the chaff and other refuse contents still remaining in the basket, 10, into the tank, 63, and from the tank, 63, the materials dumped therein are discharged by an outlet pipe, 64, leading from the bottom of tank, 63, to the tank, 54, and the flow or passage of the chaff, etc., is facilitated or accomplished by discharging water thereon while in the tank, 63, in sufficient volume for the purpose. The outlet pipe, 64, has a valve 65, just above the tank, 54, and hence by reason of the valve, 53, in the pipe, 52, the tanks, 51 and 63, may at different times be placed in communication with the tank, 54, and hence no mixing of the seeds of value removed as a result of the treatment in tank, 51, and the chaff coming from tank, 63, will take place, and if there is any residue of either remaining in the tank, 54, the amount remaining will be unimportant. The water or liquid to flush the chaff and other like waste from the tank, 63, may be taken by a pipe, 66, that leads from the bottom of the tank, 62, a valve, 67, being provided to control the outflow through the pipe, 66. A pipe, 68, connected with the tank, 62, has a valved connection, 69, with each of the solution tanks, 24, 24ᵃ and 24ᵇ, and tanks, 51 and 63, for the purpose of replenishing the solution in such tanks, and in the case of the tanks, 24ᵃ and 24ᵇ, of diminishing the density thereof which is apt to be increased in the operation of the apparatus by the transfer from tank, 24, of solution of the greatest density along with the contents of the basket, 10.

In some cases it may not be necessary to submerge the final residue of chaff, etc., in the water or liquid of tank, 51, but merely to wash or rinse off from such residue adhering solution and for that purpose a spray head, 70, may be provided having a valved pipe that takes water or liquid from the overhead tank, 62, such spray head, 70, being movably supported by a suitable flexible pipe connection to permit its movement to and from position for use.

It will be observed that with the complete unit beginning with the gravity solution tank, 24, 24ᵃ, or 24ᵇ, and ending with the centrifugal or other drier, the seeds of value, whether first or second grade, do not traverse, on their way to the point of final discharge from the drier mechanism as a finished product, any pipes or tanks through which seeds of different grade or other material have previously passed, and hence there is no danger of spoiling or contaminating the separated seeds of value which might possibly exist if the various grades of seed separated or the separated bodies of other kind passed in succession through the same pipes or tanks to the walls of which seeds or materials previously passed therethrough might adhere and, through inattention or unskillful operation of the apparatus, might not first be removed. The danger exists in the case of the final or waste residue which is treated in tanks, 51 and 63, because the product of the treatment in these tanks is delivered to the one tank, 54, and passes therefrom through the same pipe to the centrifugal, 45, but in this case any slight mixture is of no real importance because of the low value of the products of tanks, 51 and 63. The chaff or other wholly useless light stuff delivered to the tank, 63, might be discharged to a waste pile instead of being delivered to the tank, 54, and thence passed to the centrifugal, 45. It may be desirable, however, to treat and preserve this dockage because as a rule, a customer having his seed cleaned desires to know just how much dockage resulted from the treatment of his seed.

As the liquid removed by the action of the centrifugal is gravity solution, and therefore it is desirable to salvage it for use over again, a discharge pipe may be run from the centrifugal to the salvage tank, already provided, such arrangement being shown in Fig. 1 where the centrifugal, 45, is shown provided with a discharge pipe, 71, which leads to and empties in the salvage tank, 42.

Figure 4:
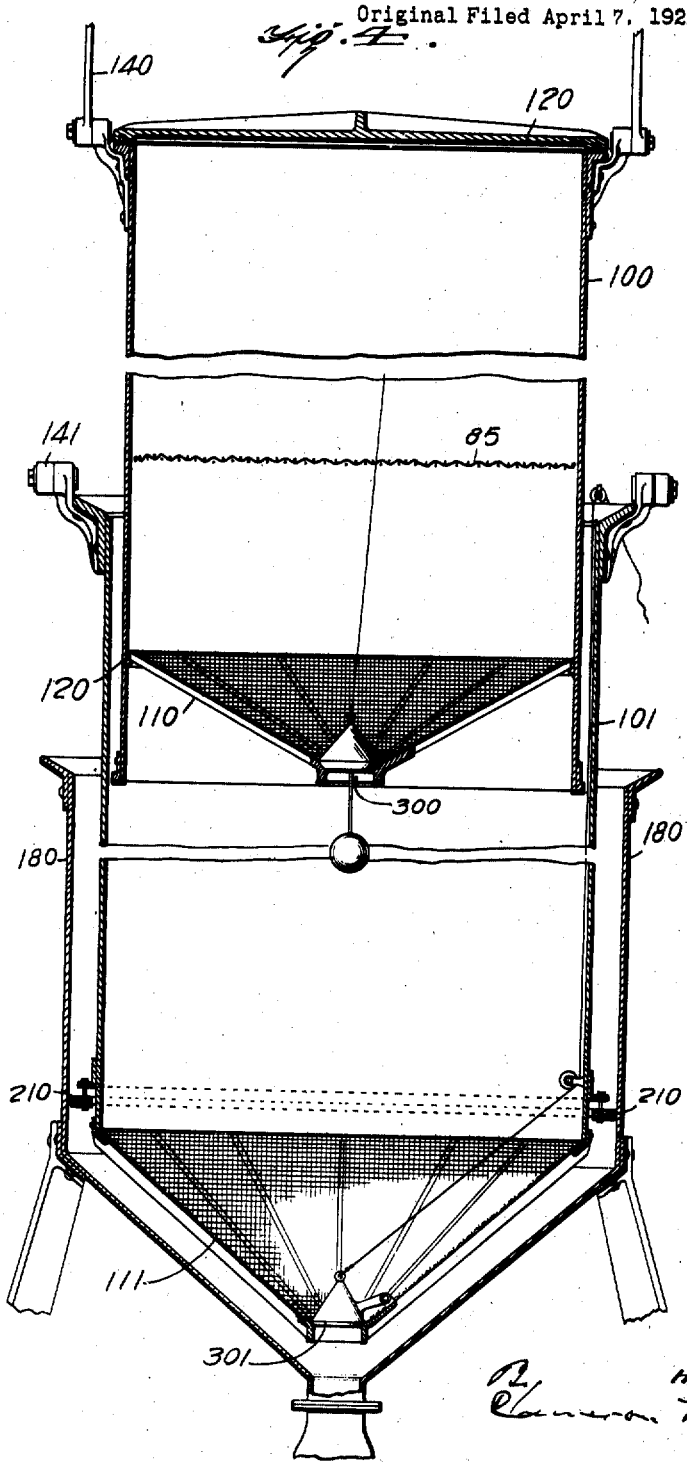
Fig. 4 is a vertical section similar to Fig. 2 of the embodiment of my invention shown in Fig. 3.
Figure 5:
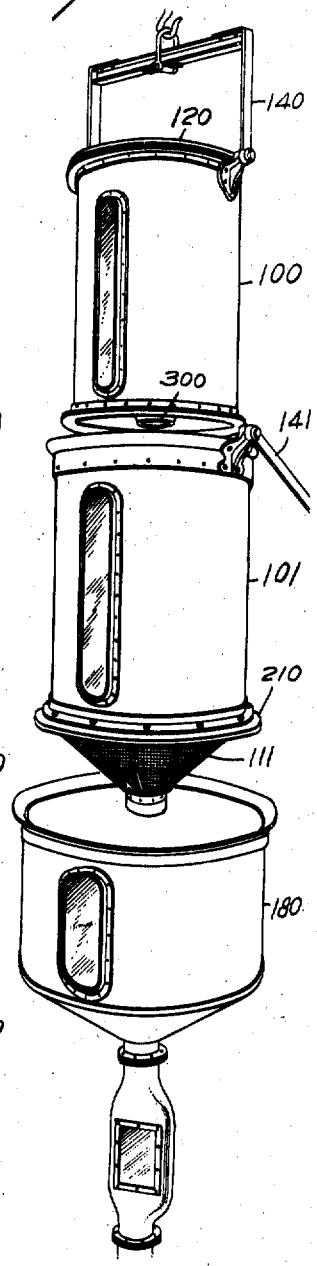
Fig. 5 is a perspective view of the members shown in Fig. 4 separated.

My invention may be embodied in or practiced by apparatus in which the various treating tanks in succession deliver their respective products to a common outlet, such an arrangement having the advantage of simplification of apparatus but which will not effect the perfect results of the individual units as above described except with a high degree of care in the operation of the apparatus on the part of the workmen. In Figs. 3 to 5 I illustrate apparatus having a common outlet for the products of the various treating tanks and which in other respects differs from what is illustrated in Figs. 1 and 2, and I will now describe what is shown therein.

The mixture containing and handling basket appearing in Figs. 3 to 5 comprises two cylinders, 100 and 101, one of which is of less diameter than the other so that it may be moved in a telescopic fashion into and out of the other, the smaller or inner cylinder, 100, having a bottom, 110, of foraminous or reticulated material with a valved outlet, 300, and having a movable lid or cover, 120, while the large or outer cylinder, 101, has no lid or cover but does have a foraminous bottom, 111, with a valved outlet, 301. Near its lower end the cylinder, 101, carries a valved piston, 210, by which the pressure producing or pumping action on the liquid in the various water or solution-holdng tanks is produced and the liquid transferred or moved back and forth between such tanks and the basket. Both cylinders have bails of handles, that of the smaller cylinder being designated 140, and the bail or handle of the larger cylinder, 101, being designated 141, by which either alone or together the cylinders may be suspended by the trolley hoist, 16, which may be run back and forth upon the overhead track or beam, 17.

The mixture to be treated is placed in the basket cylinder, 100, and lowered into the basket cylinder, 101, which has already been placed in the plain water tank, 180, for first treatment, and the two cylinders of such basket are then together moved up and down in the tank, 180, to force the water with the necessary pressure into the basket cylinder, 100, the result of the treatment being the stratification of the chaff and other light material at or adjacent the level of the water in the cylinder, 100. The valved outlet, 300, from the basket cylinder, 100, is now opened to empty therefrom into the basket cylinder, 101, all the components of the mixture except said stratum of chaff or other light material, and that being accomplished the basket cylinder, 100, alone is lifted to clear the basket cylinder, 101, and is carried by the trolley to the point of discharge of the chaff or like refuse which preferably is a tank, 63, having a valved outlet pipe, 64, whose discharge end is carried to a suitable point.

A simplified construction is shown in Fig. 6 in which after the delivery of the lowermost stratum to the tanks, 281, 281[a] and 281[b] (corresponding to the tanks 28, 28[a] and 28[b]), which respectively are below solution-holding tanks, 241, 241[a] and 241[b], corresponding to the solution-holding tanks of Fig. 1, such stratum is passed directly to a centrifugal, 451, 451[a] or 451[b], (according to the unit involved, from which the gravity solution is discharged) by a pipe 452, to a salvage tank, 453, from which by a pump, 454, it may be returned by a pipe, 455, to the gravity tank, 241. After the gravity solution is thus drained from the centrifugal, the seed or solid material remaining therein which may have solution adhering to it is washed or rinsed by clear water which may be flowed into the centrifugal from a tank, 456, through a valved outlet, 457. The rinsing water is drained from the centrifugal by a valved outlet pipe, 458, that discharges it to a catch tank, 459, from which by a pump, 460, it may be returned to the tank, 456, for reuse until the water reaches such a point of saturation that it forms a gravity solution that may be used in the gravity tanks, the tank, 456, being then replenished with normal water. The apparatus shown in Fig. 6 includes apparatus shown in Fig. 1 but not needing further description as the description given in connection with Fig. 1 is sufficient. As at no time from the discharge of seed or material from the treating tanks, etc., of a unit to the centrifugal of that unit, is the seed not in liquid, there can be no lodgment of the seed at an intermediate point of the apparatus which would have to be removed before the apparatus could later be used on a different lot of seed mixture.

In some mixtures of seeds the specific gravities and sizes of different classes in the mixture are so nearly the same as to make separation by known appliances or methods difficult, if not impossible. I have discovered that most seeds of value more readily absorb moisture than do noxious seeds. I take advantage of this by soaking such mixtures in water or an aqueous solution. This results in a greater change in the specific gravity and size of the seeds of value than of the noxious seeds, and thus so differentiates the two classes of seeds that they may be readily separated by my apparatus and method employing gravity solutions, or by screens or sieves which depend upon difference in size to effect the separation.

Inasmuch as in the successive use of the apparatus with mixtures coming from different sources, it may be important to preclude the presence in the baskets of any residue of seed from a previous treatment, it may be desirable to provide means for assuring the removal of such residue. Seed might remain lodged upon the perforated bottom, 11, of the basket, whose removal could be effected in various ways. For example, the basket lifted out of the water or solution-holding tank could be partially or wholly inverted, and air or water by a suitable hose could be projected from the underside of the perforated bottom, to blow or wash adhering seed therefrom which would be discharged through the opening at the other and normally top end of the basket. If air is used, it would dry or help to dry the seed thus dislodged and removed from the basket.

Inasmuch as it is advantageous to scarify seed for planting, I contemplate providing on the inner walls of the centrifugal abrading means, so that simultaneously with the moisture removing operation, the scarifying can be done, the arrangement to be such that only during a portion of the time of operation of the centrifugal will the scarifying effect be produced.

In Fig. 9 I show a construction of basket which is especially adapted for cleaning and separation of the good from the bad or defective and the grading of potatoes as to size. In this case, the basket cylinder, 102, is subdivided by horizontal screen form or perforated partitions, 103, the openings of the respective partitions being of graduated size, the partition with the largest openings being at the highest level and the others at lower levels according to the sizes of the openings or mesh. Thus by the action of the liquid within the basket, the rotten or defective potatoes being lighter than the sound potatoes will accumulate at the top of the liquid and by moving the basket up and down the potatoes will gradually accumulate according to their respective sizes upon the several partitions and thus be graded according to size. The perforated partitions or screens, 103, are attached at their edges to a frame consisting of several vertical parallel bars or rods, 104, by which the partitions are supported for vertical movement and when the desired separation or grading has been accomplished and the basket is removed from the treating tank, it may, as shown in Fig. 9, be supported at its bottom over a hole, 105, in a table or platform, 106, and then the partition-supporting frame may be lowered to place the partitions in succession below the supporting table, 106, with the result that the potatoes resting upon a partition will roll or fall therefrom as the partition passes beneath the table, 106, the potatoes as they roll from a partition being received by an inclined guide, 107, which directs them to a suitable receptacle. At the top the bars, 104, are connected by a ring, 108, to which is attached a bail, 109, that is connected to a supporting rod, 104[a], by the up and down movements of which the position of the partitions is fixed. The rod, 104[a], passes through a guide hole, 142, in the bail, 143, by which the basket cylinder is suspended. The partitions, 103, are preferably cone shaped as shown to facilitate the movement therefrom of the potatoes. The potatoes in the cylinder can be readily dried by hot air passed therethrough.

If found desirable the weight of the basket may be counter-balanced, for example, as shown in Fig. 1, by means of a counterweight, 72, supported by a rope or chain that passes over pulleys on the trolley, 15.

The pumping action by which the liquid is forced under pressure into and out of the basket obviously may be produced otherwise than by the use of the basket member as a piston, as for example by the pump, 73, shown in Fig. 10.

Various materials may be used to increase the density of water to provide the gravity solutions employed in the practice of my invention. Thus saccharine matter, (such as sugar, honey, glucose, syrup), water glass, salt, sodium nitrate, potassium carbonate and potassium iodide may be used, and in some cases certain of them may be used together or alone. Materials possessing insecticide properties may be used and those which have a fertilizing effect may be used.

By the term "gravity liquid" in the claims hereto appended is meant any liquid that will cause different classes of seeds to stratify therein at different levels according to their respective specific gravities.

A clear idea of the procedure involved in effecting the stratification and separation of the several components of a mixture may be had by reference to Fig. 11, in which the stratification which results from the treatment in the tank 242, containing the solution of the heaviest density is shown, at the commencement of the discharge from the basket of the gravel, etc., that is too heavy to be floated by the solution. In tank 242[a], Fig. 11, the condition after the heavy material resulting from the first solution treatment has been removed and the stratification that results from the next following treatment is illustrated, the heaviest material in such case being the seeds of value of first grade that are too heavy to be floated in the solution. The operator by watching, stops the flow from the basket 10[a] and the solution-holding tank after the lowermost strata of non-floating material has run off so that no discharge of the solution can proceed far enough to allow the bodies floating therein to pass off.

As illustrated in Fig. 11 the flow-discharge of the different strata may be effected by means of a siphon which may be a flexible tube or hose, 74, introduced through an opening in the basket wall above the level of the contents of the basket with its inlet end within the stratum, (which may be the lowest or highest or any intermediate stratum), to be drawn off, the lower or discharge end of the hose being carried to a centrifugal drier, 75. The current of liquid and seed or other bodies flowing through the siphon will be delivered directly from the basket to the centrifugal drier, from which the dried product and the solution will be separately discharged, the solution being returned to the treating tank for reuse. When the hose is withdrawn from the opening in the basket wall, such opening may be closed in an air-tight manner by a cap, 76, so that the use of the basket in connection with the closed cover at the top thereof for holding the liquid in the basket at a height regardless of the level of the liquid in the treating tank may not be interfered with. Of course, the hose could be inserted through the top of the basket by opening the cover.

By the process of flowing off a stratum of segregated bodies, which is done by gravity of siphonic action, it will be seen that no agitation or movement of the basket contents is caused which would result in remixing the components of the mixture which is a thing that occurs when removal of a stratum is attempted by some scoop or other device which is caused to travel through the solution floated bodies. This gravity or siphon separation by flowing the stratum to be removed from the basket is so efficient that although a perfectly quiescent state of the floated portion of the mixture is desirable during the flowing off process, yet no ill effects arise from a slight movement of the basket up and down during the drawing off process, and under some conditions such a slight up and down movement of the basket may promote or expedite the discharge from the basket of the bodies of the lowermost stratum, when the bottom outlet is used.

As shown in Fig. 6, the observation windows may be applied in the outlet pipe from the treating tanks instead of in the latter, such windows, 77, being provided in the enlarged portion, 78, of said pipes, 79.

In Fig. 6, (as also in Fig. 11), a siphon, 74[d], is provided as well as the discharge hole at the bottom of the basket, to draw off the basket contents, the siphon, 74[d], being passed through the top opening of the basket and of a length to discharge directly to the centrifugal, 451. This double provision makes it possible to discharge certain strata by siphonic action and others by mere gravitation through the basket bottom outlet. The siphon when not in use can be coiled up on top of the basket as shown in Fig. 6.

To enable chaff or other light stuff that would not submerge of its own weight to be siphoned off, a piston-like plunger could be placed in the basket, attached, if desired, to the siphon, near its inlet end by which the light stuff could be forced down into the liquid so as to flow off with the latter through the siphon. Or, by connecting the siphon with a suction pump, such light material could be thereby sucked out.

In Fig. 13 I show pneumatic means for removing the different strata which comprises a suction or vacuum pump, 81, and a pipe or tube, 82, that is introduced into the basket, 10[d]. In this case the basket is removed from the treating tanks and contains no liquid, so that one stratum of bodies lies upon another, and, hence, only the solid matters are drawn off. To prevent the seed or other bodies entering the pump, 81, (to their damage) the pipe or tube, 82, is made in two sections which communicate with a catch receptacle 82[a], into which the seed, etc., fall, when the air carrying them enters said receptacle, the air alone passing out of the receptacle. A screen or perforated baffle plate, 83, is in the receptacle in the path of the seed and air current, which assures the arrest of the seed.

Figure 12:
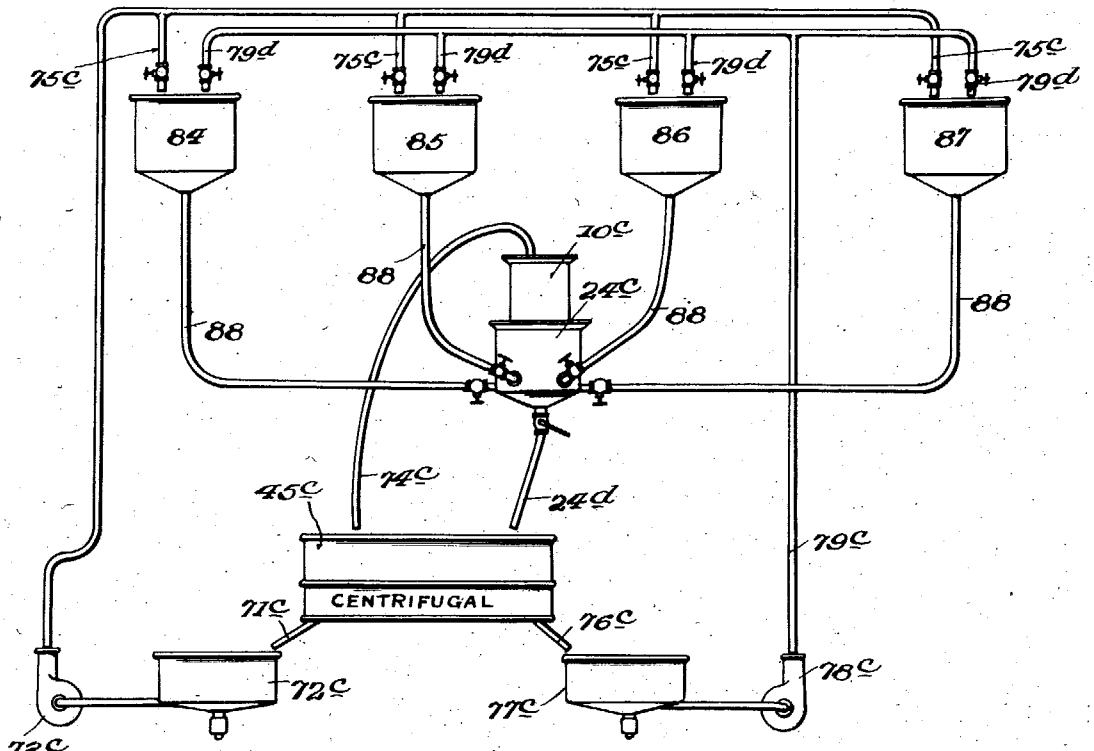
Fig. 12 is a view in elevation somewhat diagrammatic illustrating an embodiment of my invention in which the treating liquids or solutions are contained in separate tanks and a single treating tank is employed to which the different liquids are supplied in succession.

Referring to Fig. 12, water and solutions of graduated density are respectively placed in tanks, 84, 85, 86 and 87, and from each of said tanks a pipe, 88, runs to the same treating or operating tank, 24$^c$, each of such pipes having a valve to control communication between it and the operating tank, 24$^c$. The basket, 10$^c$, for holding the mixture to be treated thus requires to be moved only vertically and hence the necessity of transporting it horizontally when separate treating tanks are employed is avoided. In Fig. 12, a siphon pipe or tube, 74$^c$, is shown entering the basket, 10$^c$, at the top, its lower or discharge end delivering to a centrifugal drier, 45$^c$, having an outlet for the dried seed or solid bodies and a discharge pipe for the liquid which is delivered to a tank from which it is pumped back to the appropriate supply tank for reuse. The normal water which passes from tank, 84, to the treating tank, 24$^c$, is preferably discharged from the centrifugal by a pipe, 71$^c$, to a tank, 72$^c$, from which it may be pumped by a pump, 73$^c$, through a vertical pipe from which valved connections, 75$^c$, run to each of the supply tanks so that the water may be passed into any one of such tanks as may be required. The solution passing into the centrifugal, 45$^c$, is discharged from the latter preferably by a pipe, 76$^c$, to a tank 77$^c$, from which by a pump, 78$^c$, it is raised by a vertical pipe, 79$^c$, to the pipe having the valved connections, 79$^d$, so that the solution may be returned to any one of the solution tanks, 85, 86 and 87. By outlet, 24$^d$, there may be direct gravity removal of seeds, etc., to centrifugal, 45$^c$.

Referring again to Fig. 13, it will be understood that there is a separate pneumatic pipe or tube, 82, with its catch receptacle, 82$^a$, for each layer or stratum of bodies to be removed, and that such receptacles must be air-tight. Leading from the bottom of each receptacle, 82$^a$, is a valved outlet pipe, 89, from which the seed or bodies falling therein are discharged to a centrifugal, 45$^c$. To cause the flow from the receptacle, 82$^a$, of seed or solid bodies collected therein, water is introduced into the top by means of a valved connection, 90, with a pipe, 91, that receives water from an elevated tank, 92. From each centrifugal the water is drained into a catch tank, 93, from which it may be pumped back into the tank, 92, by a pump, 94, from which a pipe, 95, runs to the tank, 92. Inasmuch as it would be difficult if not impossible to prevent the bodies of adjacent layers being drawn off at the same time, I prefer to provide a separate tank, 82$^b$, and pneumatic pipe, 82$^c$, which at one end is connected with the vacuum pump, 81, and at the other end may be introduced into the basket, 10$^d$, to take from the latter the adjacent portions of two layers or strata and these intermediate or doubtful bodies are preferably returned to the basket, 10$^d$, by a valve discharge pipe, 89$^a$, leading from the bottom of the catch receptacle or tank, 82$^b$, to be treated over again, water being supplied to the tank for the doubtful material by a branch, 90$^a$, from the pipe 91, which takes water from the elevated tank, 92.

The centrifugal shown in detail in Fig. 14 is of a well known type having a drum, 93, with perforated walls carried by a vertical shaft, 94. Reaching or slightly below the top rim of the drum is a cylindrical shell, 95, whose inner periphery is roughened to form an abrading surface which shell is supported either stationarily relative to the rotating drum or supported so that it may operate in the opposite direction at a desired speed. As shown in Fig. 14, said shell is attached by a flange, 96, to the top of the casing of the machine as by means of bolts, 97, so that when the abrading surface becomes worn a new shell may be readily substituted. When in the operation of the centrifugal the seed rises to the top of the rotating shell the momentum it has will carry it up over and into contact with the abrading surface of the shell, 95, and the seed will thereby be scarified and will fall down through the central portion of the drum to the bottom thereof and again be thrown outward by centrifugal force crowding other seed against the perforated wall of the drum and itself again be carried to the abrading surface, this operation being carried on as long as necessary. Inasmuch as the seed thrown against and rebounding from the abrading surface is loosened up instead of being in a densely compacted state on the perforated wall of the drum, the drying of the seed is expedited since the air has freer access thereto and if desired heated air may be introduced into the centrifugal to act upon the loosened up and flying seed. A centrifugal provided with the shell with the abrading surface can also be used for hulling clover and other seed.

What I claim is:

1. The method of separating mixtures of bodies of different specific gravities which consists in placing the mixture in a receptacle, introducing the receptacle in succession to tanks that respectively contain liquids of different densities, and intermediate the action of liquid in successive tanks removing a bottom stratum of bodies from the receptacle in the presence of liquid in the stratified mass retaining in such receptacle for subsequent treatment what is above such bottom stratum.

2. The method of separating mixtures of bodies of different specific gravities which consists in subjecting the mixture while in a receptacle to the action of a liquid that causes disposition of the bodies at different levels according to their respective specific gravities, the liquid having a density that will sustain certain of the bodies but not others, and then withdrawing by gravitation the bodies too heavy to be sustained by the liquid retaining in such receptacle for subsequent treatment what is above such bottom stratum and then subjecting what is retained to the action of a liquid of different density and then withdrawing by gravitation the bodies too heavy to be sustained by such liquid.

3. The method of separating mixtures of bodies of different specific gravities which consists in subjecting the mixture while in a receptacle to the action of a liquid that causes disposition of the bodies at different levels according to their respective specific gravities, the liquid having a density that will sustain certain of the bodies but not others, then withdrawing, by gravitation, the bodies too heavy to be sustained by the liquid, and then repeating the same treatment with what remains in the receptacle in a liquid of less density than that previously used.

4. The method of separating mixtures of bodies of different specific gravities which consists in enveloping such mixture in succession in liquids of different density each liquid stratifying the bodies in different levels according to their respective specific gravities and separating a stratum in the presence of the stratifying liquid between the successive treatments.

5. The method of separating mixtures of bodies of different specific gravities which consists in enveloping such a mixture while in a receptacle in a liquid that causes the bodies to occupy different levels according to their respective specific gravities, and then separating the different strata by causing the bodies thereof to flow from the receptacle in a stream with the stratifying liquid, solely by atmospheric pressure.

6. The method of separating mixtures of bodies of different specific gravities which consists in enveloping such a mixture while in a receptacle in a liquid that causes the bodies to occupy different levels according to their respective specific gravities, and then separating the different strata by causing the bodies thereof to flow from the receptacle in a stream with the stratifying liquid, solely by gravitation.

7. The method of separating a mixture of seeds of different classes which comprises the steps of stratifying the different classes in a gravity liquid, removing the bottom stratum with its enveloping liquid by gravity, then draining the gravity liquid therefrom, and then washing from the seed the gravity liquid adhering thereto.

8. The method of separating a mixture of seeds of different classes which consists in soaking the mixture in a liquid, then stratifying the different classes in a gravity liquid with a zone of the liquid between the different strata, and then removing the strata one at a time each with its enveloping liquid.

9. The method of separating a mixture of seeds of different classes which consists in first wetting the mixture, then stratifying the mixture in a gravity liquid with a zone of the liquid between the different strata, and then removing the bottom stratum with its enveloping liquid while maintaining the other strata intact.

10. The method of separating a mixture of seeds of different classes which consists in stratifying the different classes in a gravity liquid with a zone of the liquid between the different strata, then drawing off the bottom stratum with its enveloping liquid, and then separating the seed of said stratum from its enveloping liquid.

11. The method of separating a mixture of seeds of different classes which consists in stratifying the different classes in a gravity liquid with a zone of the gravity liquid between the different strata, and then flowing off a stratum together with its enveloping liquid and without disturbing the other strata.

12. The method of separating a mixture of seeds of different classes which consists in stratifying the different classes in a gravity liquid with a zone of the gravity liquid between the different strata, and then removing a stratum together with its enveloping liquid and without breaking up the other strata.

13. The method of separating a mixture of seeds of different classes which consists in stratifying the different classes in a gravity liquid with a zone of the gravity liquid between the different strata, and then separately flowing off each strata together with its enveloping liquid.

14. The method of separating a mixture of seeds of different classes which consists in stratifying the different classes in a gravity liquid with a zone of the gravity liquid between the different strata, and then removing the several strata one at a time each with its enveloping liquid.

15. A classifying apparatus comprising a liquid-holding tank, a mixture-holding basket having an outlet at its bottom, the liquid in the tank entering the basket when placed therein and having a density that will float a certain component of the mixture but not another, and an outlet from the bottom of the tank through which to flow the mixture component not floated by the liquid.

16. A classifying apparatus comprising a liquid-holding tank, a mixture-holding basket, the tank and basket being separable, pressure means for causing an interchange of liquid between the tank and the interior of the basket, the liquid having density to float one component of the mixture but not another, and means to separate the components of the mixture when stratified.

17. A classifying apparatus comprising a liquid-holding tank, means to confine the mixture to be classified when enveloped in the liquid in such tank, means to remove from such tank a portion of the mixture classified therein along with a portion of the liquid in the tank, a drier to which such liquid and mixture component are delivered together, and means for the separate discharge from such drier of said liquid and said component.

18. A classifying apparatus comprising a liquid-holding tank, means to confine the mixture to be classified when enveloped in the liquid in such tank, means to remove from such tank a portion of the mixture classified therein along with a portion of the liquid in the tank, a drier to which such liquid and mixture component are delivered together, means for the separate discharge from such drier of said liquid, and said component, and means to return the liquid thus separated to the first mentioned tank.

19. A classifying apparatus comprising a mixture and liquid-holding receptacle, the liquid having density that will stratify the components of a mixture, and means for drawing off the liquid and stratified bodies therein by siphonic action.

20. A classifying apparatus comprising a mixture and liquid-holding receptacle, the liquid having density that will stratify the components of a mixture, means for drawing off the liquid and stratified bodies therein by siphonic action, and means for removing a stratum independently of siphonic action.

21. A classifying apparatus comprising a mixture-holding basket, a liquid-holding tank into and out of which the basket is movable, the liquid having a density that causes the stratification of the components of the mixture in the basket, and pneumatic means to remove the different strata.

22. A classifying apparatus comprising a mixture-holding basket, a liquid-holding tank into and out of which the basket is movable, the liquid having a density that causes the stratification of the components of the mixture in the basket, and pneumatic means to remove the different strata comprising a suction pump and a conduit between the pump and the basket having a catch tank for solid bodies at a point intermediate the basket and the pump.

23. In a seed separating apparatus, a plurality of storage tanks containing liquids of different specific gravities, a separating tank, valved connections from each storage tank to the separating tank, and valved return connections from the separating tank to each storage tank.

24. In a seed separating apparatus, a plurality of storage tanks containing liquids of different specific gravities, a separating tank on a different level from said storage tanks, valved connections from said storage tanks to the separating tank, a connection from the separating tank to each storage tank, and power means moving the liquid in one direction, whereby gravity moves it in the other direction.

25. In a seed separating apparatus, the combination of a separating tank containing a gravity liquid in which the different classes of seeds are stratified, a chamber below said tank, a valved connection between said tank and chamber whereby the bottom stratum with its enveloping liquid may be removed from said tank to said chamber, and means separating the liquid from the seed in said chamber.

26. In a seed separating apparatus, the combination of a separating tank containing a gravity liquid in which the seeds are stratified, a chamber below said separating tank, a valved conduit leading from said tank to said chamber whereby the bottom stratum in said tank with its enveloping liquid may be transferred from said tank to said chamber, a conduit conveying liquid from said chamber, and a tank to which said liquid is delivered from said last named chamber.

In testimony whereof I have signed this specification.

HARRY R. WARREN.